United States Patent [19]
Kanao

[11] Patent Number: 4,487,232
[45] Date of Patent: Dec. 11, 1984

[54] DOUBLED-WALLED CORRUGATED SYNTHETIC RESIN PIPE

[76] Inventor: Shiro Kanao, No. 9-18, Nanpeidai 4-chome, Takatsuki-shi, Osaka, Japan

[21] Appl. No.: 390,607

[22] Filed: Jun. 21, 1982

[30] Foreign Application Priority Data

Sep. 18, 1981 [JP] Japan .......................... 56-139647[U]

[51] Int. Cl.[3] .............................................. F16L 11/11

[52] U.S. Cl. .................................... 138/122; 138/154; 138/173; 138/150

[58] Field of Search ............... 138/121, 122, 148, 150, 138/154, 173

[56] References Cited

U.S. PATENT DOCUMENTS

| | | | |
|---|---|---|---|
| 1,287,945 | 12/1918 | Ford | 138/150 |
| 2,890,723 | 6/1959 | Evert | 138/122 |
| 2,898,941 | 8/1959 | Kilcup | 138/122 |
| 3,204,666 | 9/1965 | Lindsay et al. | 138/135 |
| 3,330,303 | 7/1967 | Fochler | 138/121 |
| 3,477,891 | 11/1961 | Hawerkamp | 138/173 |
| 4,129,152 | 12/1978 | Davis | 138/121 |
| 4,303,104 | 12/1981 | Hegler et al. | 138/121 |

FOREIGN PATENT DOCUMENTS

| | | | |
|---|---|---|---|
| 237395 | 4/1964 | Austria | 138/122 |

*Primary Examiner*—John W. Shepperd
*Attorney, Agent, or Firm*—Sughrue, Mion, Zinn, Macpeak and Seas

[57] ABSTRACT

A double-walled corrugated synthetic resin pipe comprises a straight inner pipe, and a corrugated outer pipe surrounding the inner pipe, and joined integrally thereto. The inner pipe is formed by a spirally wound flat strip of a synthetic resin having adjoining turns joined to each other along their adjoining edges, and has a generally even outer surface. The outer pipe is formed by a spirally wound corrugated synthetic resin strip also having adjoining turns thereof joined to each other along their adjoining edges. The outer pipe has a corrugation defined by a ridge portion, a groove portion, and an intermediate portion, and the groove portion has an inner surface joined to the outer surface of the inner pipe.

8 Claims, 8 Drawing Figures

DOUBLED-WALLED CORRUGATED SYNTHETIC RESIN PIPE

BACKGROUND OF THE INVENTION

1. Field of the Invention

This invention relates to a double-walled corrugated synthetic resin pipe.

2. Description of the Prior Art

A known single-walled corrugated synthetic resin pipe creates an undesirably great resistance to a fluid flowing therethrough. In order to improve this construction, there has been developed a double-walled corrugated pipe which comprises a straight inner pipe, and a corrugated outer pipe. Both the inner and outer pipes are axially extrusion molded in straight shapes and then the outer pipe is corrugated by vacuum suction, or by continuous blow molding. This double-walled corrugated pipe has a number of disadvantages which will be hereunder set forth:

(1) As the inner and outer pipes are axially extrusion molded, the synthetic resin is stretched axially of the pipes, so that its molecules are oriented along the axis of the pipes. Accordingly, the corrugated pipe is greater in axial strength than in circumferential strength. Its circumferential strength is, however, of greater importance in order for the pipe to withstand high external pressure as, for example, when buried in the ground. It is, therefore, necessary to design the pipe with a greater wall thickness.

(2) Both the inner and outer pipes are substantially uniform in wall thickness. In fact, it is impossible to provide any cross-sectional variation in the wall thickness. This results in a large loss of material, and makes it difficult to produce a corrugated pipe which is lighter in weight and less expensive, and which is suitable for use in a wide range of applications.

(3) The manufacture of a pipe having a large diameter of, for example, 500 mm or above requires a large and complicated molding apparatus, and involves a variety of technical difficulties. The product is, therefore, very expensive.

SUMMARY OF THE INVENTION

It is an object of this invention to eliminate the above drawbacks of the prior art, and provide a double-walled corrugated synthetic resin pipe which is high in crushing strength, light in weight, flexible, easy and inexpensive to manufacture even in large diameters and suitable for use in a wide range of applications.

According to this invention, there is provided a double-walled corrugated synthetic resin pipe which comprises a straight inner pipe formed by a spirally wound flat strip, and a corrugated outer pipe formed by a spirally wound corrugated strip.

The outer pipe provides the double-walled pipe with high crushing strength and flexibility, while the inner pipe provides a smooth inner surface which creates only minimal resistance to the fluid flowing therethrough. If the inner and outer pipes are appropriately varied in wall thickness, it is possible according to this invention to obtain a double-walled corrugated pipe which is useful for a variety of applications. For example, it is possible to use the pipe for draining a road, a railroad, or reclaimed land, feeding water to farmland or a factory, or draining the same, or as a gas supply or exhaust line to or from various facilities, or for protecting an electric cable.

The double-walled corrugated pipe of this invention has a number of advantages which will hereunder be summarized:

(1) The pipe has a high circumferential strength, since the synthetic resin has its molecules oriented along the extrusion molded flat and corrugated strips, and hence, substantially circumferentially around the pipes formed by winding the strips spirally. Therefore, the pipe is high in crushing strength, as well as highly flexible.

(2) If the cross-sectional shape of the flat or corrugated strip is appropriately selected, it is possible to form an inner or outer pipe with a desired wall thickness or cross-sectional shape to thereby obtain a double-walled corrugated pipe which will ideally suit the purpose for which it is intended. It is possible to make a corrugated pipe having an improved crushing strength, while being sufficiently flexible, or maintaining its flexibility at an appropriate level without impairing its crushing strength. Thus, the double-walled corrugated pipe of this invention is economical, light in weight, inexpensive, and easy to adapt for a variety of applications.

(3) Since the double-walled pipe of this invention is manufactured by winding the synthetic resin strips spirally, there are no technical problems involved in the manufacture of a pipe having a large diameter of, for example, 500 mm or above. Even a quite large pipe can be made efficiently and inexpensively by employing a simple apparatus.

DETAILED DESCRIPTION OF THE PREFERRED EMBODIMENTS

Figure 1:
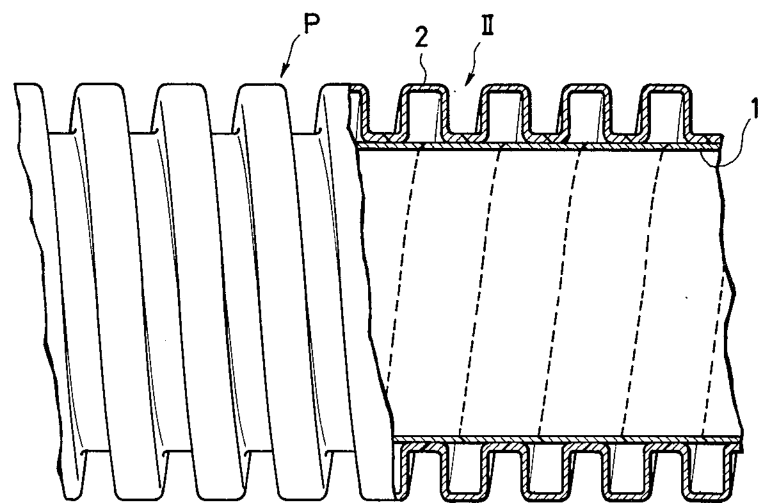
FIG. 1 is a fragmentary side elevational view, partly in longitudinal section, of a double-walled corrugated pipe embodying this invention.
Figure 2:
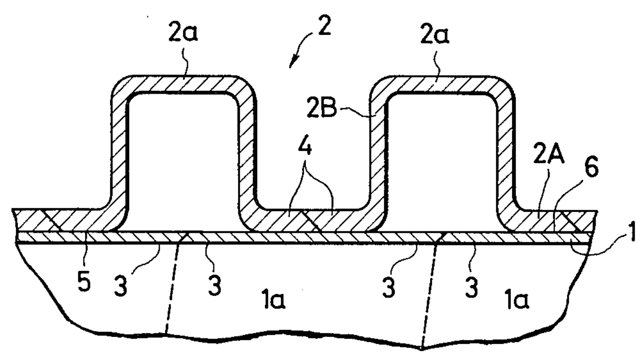
FIG. 2 is an enlarged view of part II of FIG. 1.
Figure 3:
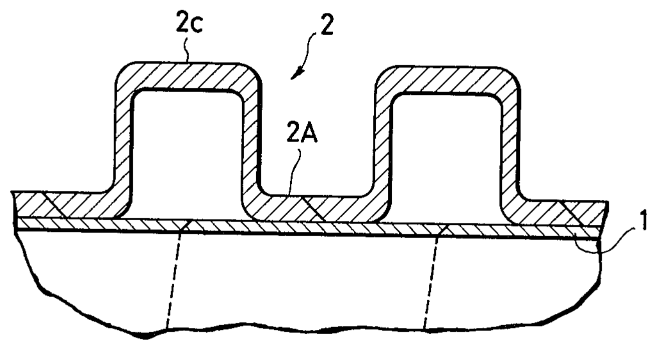
FIGS. 3 to 8 are views similar to FIG. 2, each showing a modified form of the pipe shown therein.
Figure 4:
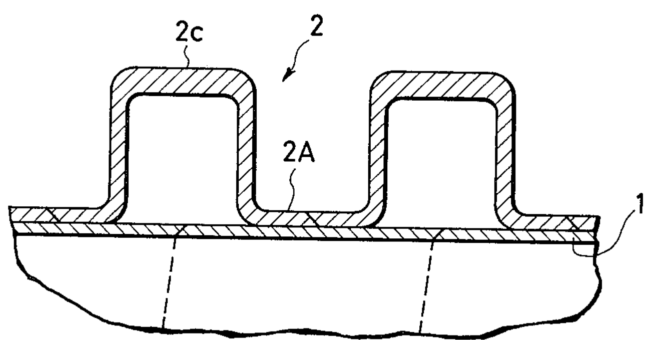
Figure 5:
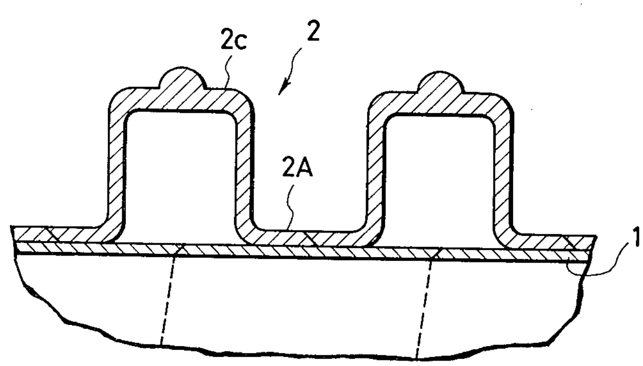

Referring first to FIGS. 1 and 2 of the drawings, there is shown a double-walled corrugated synthetic resin pipe P embodying this invention. The double-walled pipe P comprises a thin-walled inner pipe 1 formed from a synthetic resin, for example, a polyolefin resin such as polyethylene or polypropylene, or hard or soft polyvinyl chloride, and a corrugated outer pipe 2 formed integrally about the inner pipe 1 from the same or a different synthetic resin, for example, a polyolefin resin such as polyethylene or polypropylene, or hard polyvinyl chloride. The straight inner pipe 1 provides the pipe P with a smooth inner surface which creates little resistance to the fluid flowing therethrough, while the corrugated outer pipe 2 provides high crushing strength, and flexibility.

The inner pipe 1 comprises a spirally wound flat synthetic resin strip *1a* having adjacent turns thereof joined to each other along their adjoining edges 3 by fusion or adhesion, or otherwise, as shown in FIG. 2. The synthetic resin has its molecules oriented in the direction in which the strip *1a* is spirally wound.

The corrugated outer pipe 2 comprises a spirally wound corrugated synthetic resin strip *2a* having adjacent turns joined to each other along their adjoining edges 4 by fusion or adhesion, or otherwise. The synthetic resin from which the outer pipe 2 is formed also has its molecules oriented in the direction in which the strip *2a* is spirally wound. The outer pipe 2 includes a reduced diameter groove portion 2A having an inner surface 6 joined integrally with the outer surface 5 of the inner pipe 1 by fusion or adhesion. In the double-walled pipe shown in FIGS. 1 and 2, the outer pipe 2, as well as the inner pipe 1, have a uniform wall thickness.

FIGS. 3 to 8 show modifications to the double-walled pipe shown in FIGS. 1 and 2. Only the features that are different from those of the pipe shown in FIGS. 1 and 2 will hereinafter be described. In the structure shown in FIG. 3, the outer pipe 2 has a groove portion 2A and a ridge portion 2C which are both greater in wall thickness than the remaining portions. In the double-walled pipe shown in FIG. 4, the outer pipe 2 has a ridge portion 2C which is greater in wall thickness than the remaining portions. In the double-walled pipe shown in FIG. 5, the outer pipe 2 has a ridge portion 2C partially increased in wall thickness. The double-walled pipes of FIGS. 3 to 5 have improved crushing strength, while remaining satisfactorily flexible, and are particularly suitable for use in applications in which the outer surfaces must be highly resistant to wear.

Figure 6:
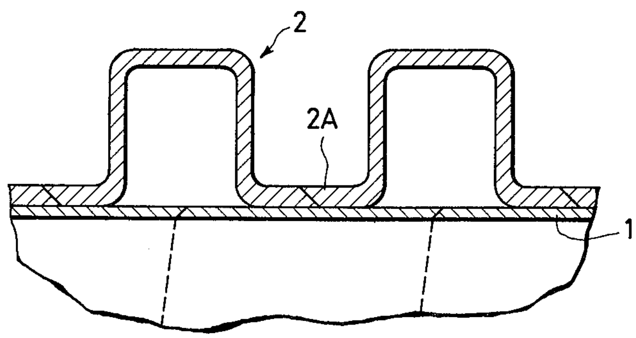

In the double-walled pipe shown in FIG. 6, the outer pipe 2 has a groove portion 2A which is greater in wall thickness than the remaining portions. This construction has improved crushing strength, and is suitable for use in applications which do not require any particular high flexibility of the pipe.

Figure 7:
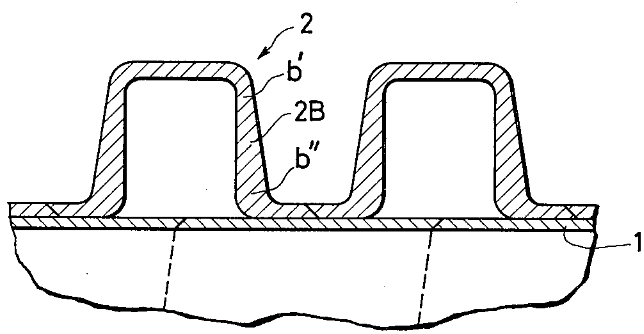

The double-walled pipe shown in FIG. 7 is particularly characterized by the varying wall thickness of the outer pipe 2 in a portion 2B between its ridge and groove portions. The portion 2B has a gradually increasing thickness toward the inner pipe 1, and thus is relatively thin at portions b' close to the ridge portion, while being relatively thick at portions b" close to the groove portion. This structure makes it possible to improve the crushing strength of the double-walled pipe more effectively and economically.

Figure 8:
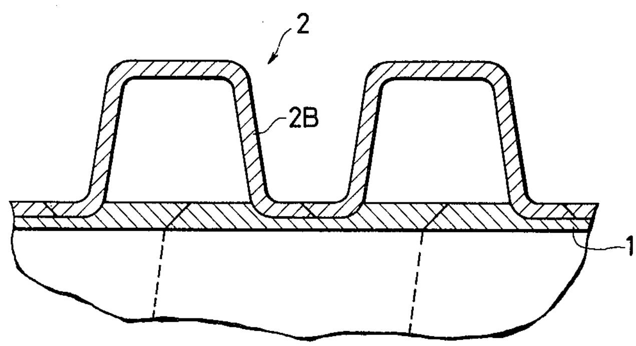

The double-walled pipe of FIG. 8 is characterized by the varying thickness of the inner pipe 1. The inner pipe 1 has a reduced wall thickness in spirally extending portions where the outer pipe 2 is joined to the inner pipe 1, while having an even inner surface. Thus, the combined wall thickness of the reduced thickness portion of the inner pipe 1 and the groove portion of the outer pipe 2 is substantially equal to the wall thickness of the remaining portions of the inner pipe 1. This structure makes the double-walled pipe highly flexible as a whole.

According to this invention, it is possible to obtain double-walled corrugated synthetic resin pipes having various degrees of flexibility and crushing strength, if the materials from which the inner and outer pipes are formed are appropriately selected. Although the invention has been described with reference to the preferred embodiments thereof, and certain modifications thereof, it is to be understood that further modifications or variations may be easily made by persons of ordinary skill in the art without departing from the scope of this invention as defined by the appended claims. For example, the spiral turns of the strip forming the inner or outer pipe may be joined to one another in fashions or positions other than that hereinbefore described. It is also possible to employ a corrugated strip having a corrugation which is square, trapezoidal, sinusoidal, or of any other cross sectional shape.

What is claimed is:

1. A double-walled corrugated synthetic resin pipe, comprising; a straight inner pipe and a corrugated outer pipe surrounding said inner pipe and joined integrally thereto, said inner pipe being formed by a spirally wound flat strip of a synthetic resin material having adjacent turns thereof joined to each other along adjoining edges thereof, said inner pipe having an outer surface, said outer pipe being formed by a spirally wound corrugated synthetic resin strip having adjacent turns thereof joined to each other along adjoining edges thereof, said strip defining said outer pipe having a corrugation defined by a ridge portion, a pair of groove portions and intermediate portions therebetween, said groove portions each having a flat inner surface joined to said outer surface of said inner pipe and wherein said synthetic resin strips are formed of extruded polymers, such that, when assembled, the molecular structure of said polymers is oriented spirally with respect to an axis of said pipe, thereby increasing the circumferential strength of said pipe.

2. A double-walled corrugated pipe as set forth in claim 1, wherein both said inner and outer pipes are uniform in wall thickness, said outer pipe being greater in wall thickness than said inner pipe.

3. A double-walled corrugated pipe as set forth in claim 1, wherein said ridge and groove portions are greater in wall thickness than said intermediate portion.

4. A double-walled corrugated pipe as set forth in claim 1, wherein said ridge portion is greater in wall thickness than said groove and intermediate portions.

5. A double-walled corrugated pipe as set forth in claim 4, wherein said ridge portion has a partially increased wall thickness.

6. A double-walled corrugated pipe as set forth in claim 1, wherein said groove portion is greater in wall thickness than said ridge and intermediate portions.

7. A double-walled corrugated pipe as set forth in claim 1, wherein said intermediate portion is generally greater in wall thickness than said ridge and groove portions, and has a gradually increasing wall thickness which is greater closer to said groove portion than to said ridge portion.

8. A double-walled corrugated pipe as set forth in claim 1, wherein said inner pipe has a spirally extending reduced wall thickness portion, while having an even inner surface, said groove portion of said outer pipe being joined to said reduced wall thickness portion.

* * * * *